Patented Jan. 6, 1953

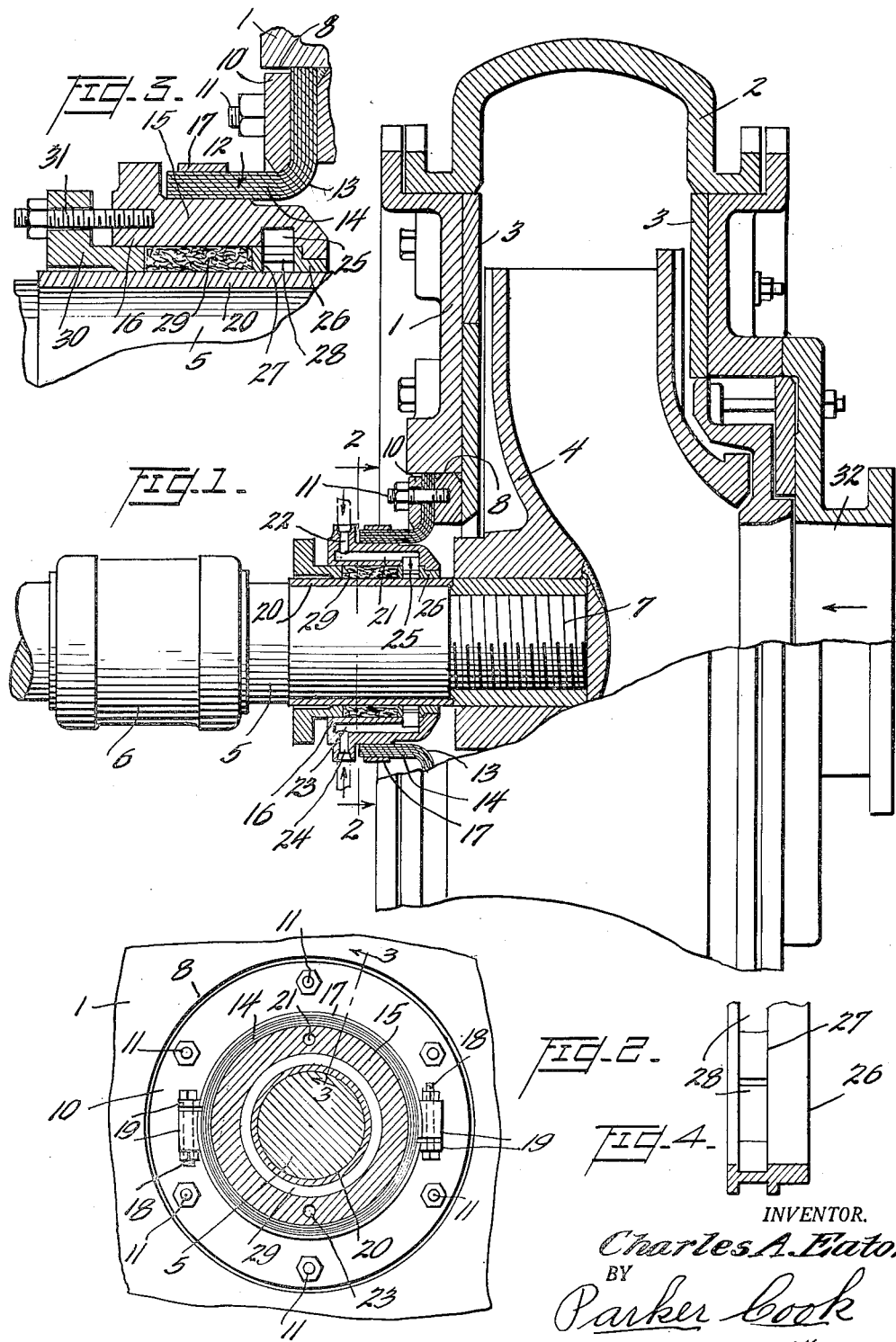

2,624,599

UNITED STATES PATENT OFFICE 2,624,599

ARRANGEMENT FOR FLEXIBLE STUFFING BOXES

Charles A. Eaton, Atlantic City, N. J.

Application August 10, 1950, Serial No. 178,685

1 Claim. (Cl. 286—9)

My invention relates to new and useful improvements in an arrangement for stuffing boxes, and more particularly to a floating or flexible stuffing box that is especially adapted for use with relatively large centrifugal dredging pumps.

Where a large dredging pump is used, having, say, a capacity of from around nine or ten thousand gallons a minute, and the impeller shaft is driven by an eleven or twelve hundred H. P. motor, it has been found that with the ordinary or conventional type of stuffing box on the impeller shaft, the life of the stuffing box is relatively short, due to the fact that the rigid stuffing box functions like a bearing, for which use it was never designed, and there is a tendency for the shaft to whip due to the fact that it and the impeller become statically and dynamically unbalanced.

This whip of the shaft, and the fact that the water is laden with sand, not only quickly wears the metal of the stuffing box but also the packing about the shaft; and, in some instances, will not only cut grooves in the shaft or its liner but will even cause the shaft to break off near its end and where the threads for the impeller terminate.

In these relatively large pumps, as before mentioned, the outer end of the impeller shaft is at times at least thirty inches away from the main radial and thrust bearings for the shaft; and, as there is about twelve thousandths of an inch clearance between the stuffing box ring and the shaft, even though water is forced through the gland or stuffing box to keep the sand out of the bearing, still the life of the stuffing box is relatively short.

An object of the present invention therefore is to provide a centrifugal pump with a clamping ring about the central aperture, through which passes the impeller shaft; and to clamp a flexible support for the stuffing box or gland so that the stuffing box will flex with the shaft and thus greatly prolong the life of the stuffing box and the shaft.

Still another object of the invention is to provide a flexible stuffing box for the impeller shaft that is clamped in a flexible support made up of sheets of rubber and fabric, so that the support will be water-tight as well as strong and flexible. Thus, any whip or pounding of the impeller shaft will not affect the stuffing box; nor will the sand have a tendency to cut the shaft or liner or packing.

Still another object of the invention is to provide a flexible stuffing box wherein only slight changes have to be made in the existing stuffing boxes and pumps, so that the present flexible stuffing box may quickly and readily be installed.

With these and other objects in view, the invention consists in certain new and novel arrangements and combination of parts, as will hereinafter be more fully explained and set out in the claim.

Referring now to the drawings, showing a preferred form,

Fig. 1 is a view, partly in elevation and partly in section, showing a pump of the centrifugal type, and showing the impeller shaft mounted in a flexibly supported stuffing box or gland, Fig. 2 is an enlarged, sectional view taken on line 2—2 of Fig. 1, looking in the direction of the arrows, Fig. 3 is a fragmentary, sectional view on an enlarged scale, taken on line 3—3 of Fig. 2, showing the manner of supporting the stuffing box with respect to the pump casing; and Fig. 4 is a fragmentary detailed view, showing a portion of the ring forming a part of the stuffing box.

At the outset, it will be understood that I have only illustrated that much of a centrifugal pump as is thought necessary to explain the invention.

Referring now specifically to the several views, there is shown a casing 1, having parallel radial walls and an outer peripheral enclosure member 2, which is bolted in place. There are the usual inner liners 3, which may be replaced in case of wear.

It will be understood that the pump is a conventional one and so is the impeller 4 and its driving shaft 5, which is mounted in the bearing 6.

As may be seen in Fig. 1, the shaft 5 is threaded at its distal end 7 and on which is mounted the impeller 4. There is the usual opening 8 centrally of the casing 1 through which extends the aforementioned impeller shaft 5.

Heretofore in this opening 8 was rigidly secured a stuffing box with its packing to prevent any leakage of water from within the casing 1 about the said shaft 5; and, as heretofore mentioned, by providing a rigid stuffing box, the life of the stuffing box and its packing was very limited. The shaft often became scored, or its liner, and even broken at the inner terminal of the thread 7, due to the fact that the whip of the shaft 5 pounding against the stuffing box would fatigue the metal and cause the shaft to fracture.

In the present instance, about the walls of the opening 8 there is fitted a circular ring 10 which is bolted in position by the bolts and nuts 11 to the main casing 1; and clamped between the ring 10 and the outer wall of the casing 1 is a flexible sleeve or support 12, which is laminated or made up of plies of rubber and fabric, and, in the present instance, built up to substantially three-quarters of an inch in thickness.

It will be noticed that this support 12 is bent at right angles to itself as at 13, so that the horizontal extending leg 14 may be clamped about the outer casing 15 of the stuffing box or gland 16. The band 17 is formed of metal and is in the form of a split ring clamp, so that it can be tightened by the bolts 18 passing through the ears 19, as may be seen in Fig. 2.

Thus, there is a flexible support for the stuffing box 16 so that the stuffing box 16 may float or flex with the impeller shaft 5, and any pounding or unstable balance does not put any additional wear on the stuffing box or its packing, which was always present in the conventional stuffing box of a rigid nature.

Also, to prevent wear of the main shaft, there is shown a collar or sleeve 20 which is also conventional when rigid stuffing boxes are used, so that any scoring due to sand in the stuffing box will wear the sleeve or collar 20 rather than the shaft 5 itself.

Referring now more particularly to the outer casing 15 of the stuffing box 16 and to Figs. 1 and 2 for the moment, there will be seen the longitudinally extending bore or orifice 21 which registers at its proximal end with the radially extending inlet 22; and there may also be seen a similar bore or orifice 23 with its inlet 24. These two bores 21 and 23 register at their distal ends with the circular groove 25 in which there is mounted the bronze ring 26, which ring 26 extends flush with the outer end of the casing 15 and fits about the sleeve 20 on the impeller shaft 5.

In the present instance, the clearance between this ring 26 and sleeve 20 is about twelve thousandths of an inch.

The ring 26 has a peripheral groove 27 that may be seen in Fig. 4, and this groove 27 is slotted at points around its periphery as at 28 so that water under pressure may be forced through the bores 21 and 23 and through the slots 28 in the ring 26 to thus force any sand and water from between the outer periphery of the ring 26 and the sleeve 20 about the impeller shaft 5.

The water pressure through the stuffing box is generally set for about fifteen pounds greater than the pressure within the main casing 1 of the pump, so that the sand and water will tend to be forced back into the pump casing 1.

In Figs. 1 and 3 there may be seen the packing 29 which is held in position by the packing nut 30 which is held in place by the studs 31, as may be seen in Fig. 3. The studs 31 may be taken up at any time to put the packing 29 under the desired compression.

From the foregoing it will be seen that I have provided a flexible gland or stuffing box arrangement that is particularly adaptable for relatively large pumps of the centrifugal type, and wherein the pump is used for dredging purposes and where the water is heavily saturated with sand.

I have shown the conventional inlet 32 but have not shown the peripheral outlet which is common to all centrifugal pumps.

It will also be seen that by providing a flexibly mounted stuffing box the life of the bearing or stuffing box is greatly enhanced; and the chance of fracturing the shaft is greatly reduced, as any instability or loss of dynamic or static balance will not affect the function of the floating stuffing box.

It might also be mentioned "en passant" that where a conventional stuffing box and support were heretofore used, the lift of the stuffing box would be a month to a month and a half; and I have successfully used the one illustrated for over a year without repair.

Many slight changes might be made without departing from the spirit and scope of the invention.

Having thus described my invention, what I claim is new and desire to secure by Letters Patent is:

In a flexible stuffing box arrangement for centrifugal dredging pumps, a casing having a central aperture to receive an impeller shaft, a laminated water-proof flexible sleeve bent outwardly to form a restricted opening; a ring bolted to the casing and clamping the outer periphery of the sleeve about the impeller shaft opening in said casing; a stuffing box, including an outer casing; an adjustable ring for clamping the free edges of the laminated sleeve about the casing of the stuffing box, the said outer casing of the stuffing box provided with orifices to receive water from without the casing under greater pressure than the pressure in the casing; a slotted ring within the casing and registering with said apertures; a packing fitted within the casing, an adjustable nut for holding the packing in position; and the water pressure through the stuffing box forcing any sand from within the slotted ring back into the casing.

CHARLES A. EATON.

REFERENCES CITED

The following references are of record in the file of this patent:

UNITED STATES PATENTS

| Number | Name | Date |
|---|---|---|
| 1,029,474 | Smith | June 11, 1912 |
| 1,104,361 | Lassman | July 21, 1914 |
| 1,550,591 | Stone | Aug. 18, 1925 |
| 2,004,652 | Dempsey | June 11, 1935 |
| 2,133,487 | Sparge | Oct. 18, 1938 |
| 2,190,670 | Mann | Feb. 20, 1940 |
| 2,245,866 | McLachlan | June 17, 1941 |
| 2,509,162 | Moses et al. | May 23, 1950 |

FOREIGN PATENTS

| Number | Country | Date |
|---|---|---|
| 134,828 | Great Britain | of 1919 |
| 209,265 | Great Britain | of 1923 |
| 703,143 | France | of 1931 |